United States Patent
Park

(10) Patent No.: US 9,977,115 B2
(45) Date of Patent: May 22, 2018

(54) APPARATUS AND METHOD FOR FORMING BEAM FOR PROCESSING RADAR SIGNAL

(71) Applicant: ELECTRONICS AND TELECOMMUNICATIONS RESEARCH INSTITUTE, Daejeon (KR)

(72) Inventor: Ki Hyuk Park, Incheon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 309 days.

(21) Appl. No.: 14/745,444

(22) Filed: Jun. 21, 2015

(65) Prior Publication Data

US 2016/0131741 A1    May 12, 2016

(30) Foreign Application Priority Data

Nov. 10, 2014    (KR) .................... 10-2014-0155583

(51) Int. Cl.
*G01S 7/35* (2006.01)
*G01S 7/03* (2006.01)
*G01S 13/34* (2006.01)
*G01S 13/42* (2006.01)

(52) U.S. Cl.
CPC ............ *G01S 7/032* (2013.01); *G01S 13/345* (2013.01); *G01S 13/42* (2013.01); *G01S 2007/358* (2013.01)

(58) Field of Classification Search
CPC ........... G01S 13/426; G01S 2013/0245; G01S 7/032; H01Q 15/02; H01Q 21/065; H01Q 25/008; H01Q 3/44
USPC .................................................. 342/175, 194
See application file for complete search history.

(56) References Cited

U.S. PATENT DOCUMENTS

| | | | | |
|---|---|---|---|---|
| 5,817,023 A | * | 10/1998 | William Daft | ....... G10K 11/346 600/447 |
| 2005/0113142 A1 | * | 5/2005 | Felter | ..................... H04B 1/709 455/562.1 |
| 2011/0084869 A1 | * | 4/2011 | Holly | ..................... G01S 13/04 342/27 |
| 2012/0146842 A1 | | 6/2012 | Kang | |

OTHER PUBLICATIONS

Xu Xin et al., "The Realization of Digital Beamforming Based on FPGA and DSP", 2010 ISDEA, vol. 2, pp. 713-716.

* cited by examiner

*Primary Examiner* — Timothy A Brainard
(74) *Attorney, Agent, or Firm* — LRK Patent Law Firm

(57) ABSTRACT

An apparatus and method for forming a beam for processing a radar signal is provided. In order to form a beam, by processing signals that are received through a plurality of antennas, a first symbol signal and a second symbol signal, which are complex signals are generated. The first and second symbol signals include a plurality of symbols that are arranged in an antenna array order. By applying a weight value on each antenna basis and a window coefficient for windowing processing to sequentially input each symbol of the first and second symbol signals, and by accumulating on a beam basis to generate, a beam symbol signal is generated.

10 Claims, 12 Drawing Sheets

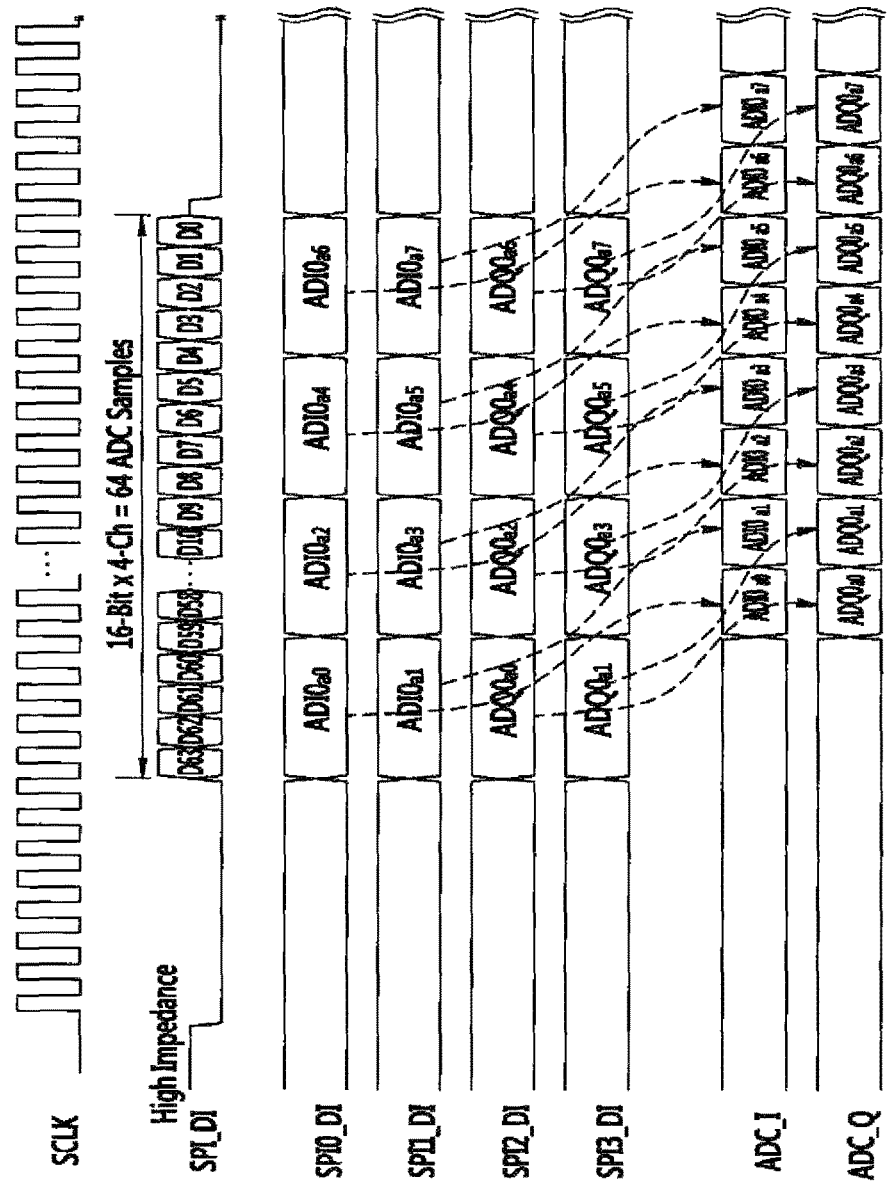

APPARATUS AND METHOD FOR FORMING BEAM FOR PROCESSING RADAR SIGNAL

CROSS-REFERENCE TO RELATED APPLICATION

This application claims priority to and the benefit of Korean Patent Application No. 10-2014-0155583 filed in the Korean Intellectual Property Office on Nov. 10, 2014, the entire contents of which are incorporated herein by reference.

BACKGROUND OF THE INVENTION

1. Field of the Invention

The present invention relates to a beam forming apparatus. More particularly, the present invention relates to an apparatus and method for forming a beam for processing a radar signal.

2. Description of the Related Art

A radar signal is a representative electromagnetic wave signal, has intrinsic signal characteristics in time, frequency, and space areas according to a peripheral environment, and various techniques for such a radar signal processing have been researched. Radar signal processing requires an intrinsic algorithm and structure, unlike a generally well-known voice or image signal processing field, and should extract target information by processing a signal of a high speed and a large capacity in real-time for a given beam scan time.

In a radar system, an antenna provides an external image, and performance thereof becomes a decisive element for quality of an image. As quality of information increases and information gradually becomes complex, a request for improvement of antenna performance further increases. In such a situation, new digital beamforming (DBF) may be, an excellent technique for improving antenna performance.

Beamforming represents forming of a large directional antenna shape by combining propagation signals from arrangement of small nondirectional antennas. In beamforming, because a direction of a formed antenna beam may be electromagnetically set, in wireless communication, by directing an antenna in a signal source direction, beamforming is used for reducing interference and enhancing communication quality and may be used in an application field that searches for a direction of a signal source.

In general, a DBF apparatus receives a digital signal from an array antenna and has a structure that performs spatial processing of the signal, and an array antenna transmits electromagnetic waves at many locations at an opening surface of the antenna, and by converting and processing signals that are received by each receiving element to a complex digital signal, the DBF apparatus outputs a set of beams having different directions in space. Particularly, when processing a received signal, weight values are multiplied by signals of each antenna and these signals are added and used. However, by generating a signal for beamforming by processing in parallel signals of an antenna, it is difficult to apply such a method of forming a beam to a radar system in which the number of radar beams variably changes and a structure thereof becomes further complex.

SUMMARY OF THE INVENTION

The present invention has been made in an effort to provide an apparatus and method for forming a beam having advantages of being capable of forming in a more simple structure in a radar system in which a number of radar beams is variable.

An exemplary embodiment of the present invention provides a beam forming apparatus including: a symbol formatter that generates a first symbol signal and a second symbol signal, which are complex signals, by processing signals that are received through a plurality of antennas, wherein the first and second symbol signals include a plurality of symbols that are arranged in an antenna array order; and a digital beamforming unit that applies a window coefficient for windowing processing and a weight value on each antenna basis to sequentially input each symbol of the first and second symbol signals and that generates a beam symbol signal by accumulating on a beam basis.

The digital beamforming unit may include: a memory in which a weight value on each antenna basis and window coefficients for a windowing processing are stored; a first operation processor that multiplies and outputs the weight value and the window coefficient; a second operation processor that multiplies and outputs each symbol of the input first and second symbol signals by a signal that is output from the first operation processor; and an accumulation unit that accumulates signals that are output from the second operation processor on a beam basis and that outputs the beam symbol signal based on signals that are accumulated on a beam basis at a preset time point.

The accumulation unit may output the beam symbol signal at a segment in which a symbol corresponding to a final antenna of the first and second symbol signals is input.

The beam forming apparatus may further include a selection unit that selects a weight value and a window coefficient that are stored at the memory based on a beam type and the beam number to generate and the antenna number to provide the weight value and the window coefficient to the first operation processor. The beam type may include a beam for a short distance for detecting a target corresponding to a short distance that is shorter than a predetermined distance, and a beam for a long distance for detecting a target corresponding to a long distance that is longer than the predetermined distance.

The symbol formatter may include: a plurality of segmentation units that divide data that are included in a signal that is received on an antenna basis in a preset symbol unit; and a multiplexer that multiplexes data that are divided in the plurality of segmentation units and that outputs the first symbol signal and second symbol signal by rearranging the data in an antenna array order.

The beam forming apparatus may further include: an antenna unit including a plurality of antennas; a receiver that converts and outputs signals that are received through each antenna to a signal of a baseband; and a signal converter that provides signals that are output from the receiver to the symbol formatter that converts and outputs the signals to digital data.

The beam forming apparatus may be applied to a radar system in which the number of radar beams to generate is changed.

Another embodiment of the present invention provides a method of forming a beam in a radar system, including: generating a first symbol signal and a second symbol signal, which are complex signals, by processing signals that are received through a plurality of antennas, wherein the first and, second symbol signals include a plurality of symbols that are arranged in an antenna array order; generating a weight value signal by applying a weight value on each antenna basis and a windowing coefficient for windowing processing to sequentially input each symbol of the first and second symbol signals; and generating a beam symbol signal by accumulating on a beam basis to generate the weight value signal.

The generating of a weight value signal may include: multiplying and outputting the weight value and the window coefficient; and outputting the weight value signal by multiplying a signal in which the weight value and the window coefficient are multiplied to each symbol of the input first and second symbol signals.

The generating of a weight value signal may further include: before the multiplying and outputting of the weight value, selecting a weight value and a window coefficient based on a beam type and the beam number to generate and the antenna number.

The generating of a beam symbol signal may include accumulating the weight value signal on a beam basis to generate, and outputting the beam symbol signal based on an accumulated signal at a segment in which a symbol corresponding to a final antenna of the first and second symbol signals is input.

The generating of a first symbol signal and a second symbol signal may include: dividing data that are included in a signal that is received on an antenna basis in a preset symbol unit; and outputting the first symbol signal and the second symbol signal by multiplexing the divided data and rearranging the divided data in an antenna array order.

BRIEF DESCRIPTION OF THE DRAWINGS

FIGS. 4A and 4B are operation timing diagrams of a symbol formatter according to an exemplary embodiment of the present invention.

DETAILED DESCRIPTION OF THE EMBODIMENTS

Figure 1:
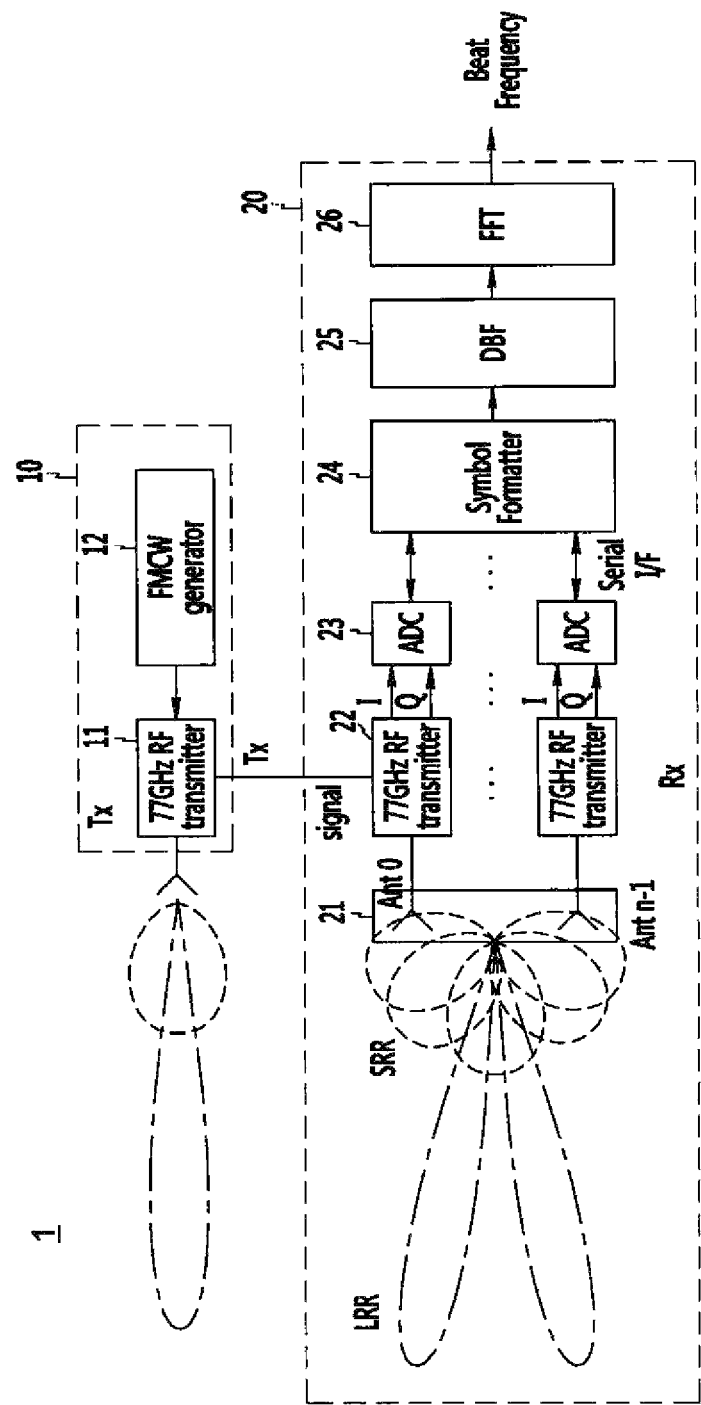
FIG. 1 is a diagram illustrating a structure of a radar signal processing apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in an entire specification, unless explicitly described to the contrary, the word "comprise" and variations such as "comprises" or "comprising" will be understood to imply the inclusion of stated elements but not the exclusion of any other elements.

Hereinafter, a beam forming apparatus for processing a radar signal according to an exemplary embodiment of the present invention will be described with reference to the drawings.

FIG. 1 is a diagram illustrating a structure of a radar signal processing apparatus according to an exemplary embodiment of the present invention.

As shown in FIG. 1, a radar signal processing apparatus 1 according to an exemplary embodiment of the present invention includes a transmitting apparatus 10 and a receiving apparatus 20.

The transmitting apparatus 10 includes a transmitter 11 and a radar signal generator 12.

The radar signal generator 12 of the transmitting apparatus 10 generates a frequency modulated continuous wave (FMCM signal of a method of continuously emitting a signal in which a frequency is modulated.

The transmitter 11 transmits an FMCW signal and converts and transmits an FMCW signal of a baseband to a signal of a radio frequency (RF) band (e.g., 77 GHz band). Such a transmitter 11 is referred to as an RF transmitter.

Figure 2:
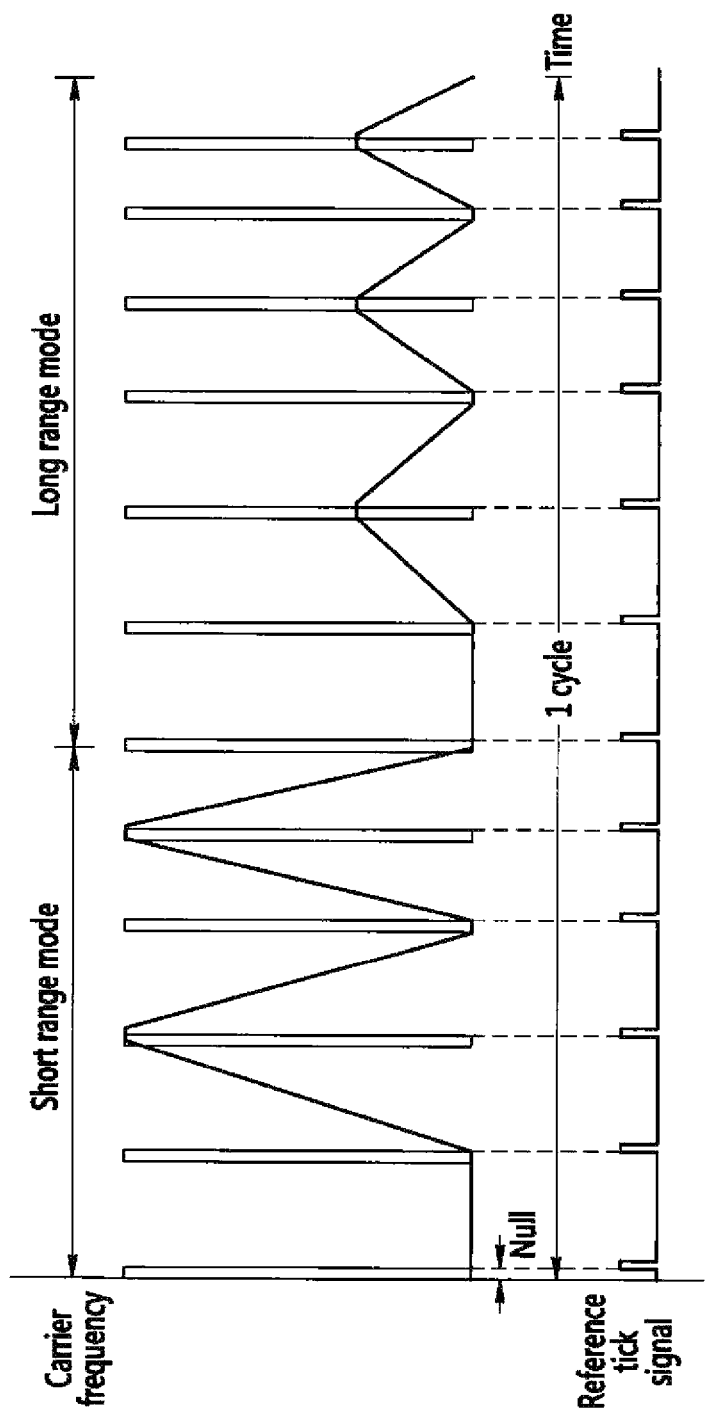
FIG. 2 is a diagram illustrating a waveform of an FMCW signal according to an exemplary embodiment of the present invention.

FIG. 2 is a diagram illustrating a waveform of an FMCW signal according to an exemplary embodiment of the present invention. As shown in FIG. 2, in an exemplary embodiment of the present invention, a waveform of an FMCW signal for supporting a short distance operation and a long distance operation of radar for one cycle is represented. The FMCW signal includes a waveform for detecting a continuously occurring short distance (a distance shorter than a preset distance) target and a waveform for detecting a long distance (a distance longer than a preset distance) target. A waveform for detecting a short distance target may be formed with 5 chirps in which a sequential frequency change slope is different, and a waveform for detecting a long distance target may be formed with 7 chirps in which a sequential frequency change slope is different.

The RF transmitter 11 converts an FMCW signal of a baseband having a waveform of FIG. 2 to a signal of, for example, a 77 GHz band, and transmits the signal to a target.

An FMCW signal that is emitted through the transmitting apparatus 10 hits a target and is reflected to be received by the receiving apparatus 20.

The receiving apparatus 20 includes an antenna unit 21, an RF receiver 22, a signal converter 23, a symbol formatter 24, a digital beamforming (DBF) unit 25, and a fast Fourier transform (FFT) unit 26. Such a receiving apparatus 20 functions as a beam forming apparatus according to an exemplary embodiment of the present invention. Hereinafter, the receiving apparatus 20 is referred to as a beam forming apparatus, and a structure and operation thereof will be described.

The antenna unit 21 of the beam forming apparatus 20 includes a multiple array antenna.

The RF receiver 22 converts and outputs signals that are received through the antenna unit 21 to a signal of a baseband. By multiplying a transmitting signal (e.g., an FMCW transmitting signal of a 77 GHz band) that is provided from the transmitting apparatus 10 to a signal that is received through each antenna, the RF receiver 22 outputs a baseband complex signal having I channel and Q channel components. The RF receiver 22 processes each of signals corresponding to each antenna of the antenna unit 21, and may be formed in plural.

The signal converter 23 converts and outputs a signal that is output from the RF receiver 22 to a digital signal, and is referred to as an analog-to-digital converter (ADC). The signal converter 23 processes each of signals that are output from a plurality of RF receivers, and may be formed in plural.

The symbol formatter 24 processes signals that are output from the signal converter 23 to generate a symbol. A plurality of signal converters and the symbol formatter 24, which is a digital signal processor, may be connected using a serial bus interface. In this case, a signal that is output from each signal converter 23 may be sequentially input by 1 bit to the symbol formatter 24.

The symbol formatter 24 divides signals (e.g., serial bits) that are input from a plurality of signal converters 23 in an ADC symbol unit, and rearranges and outputs an ADC symbol on each antenna basis in antenna order.

Figure 3:
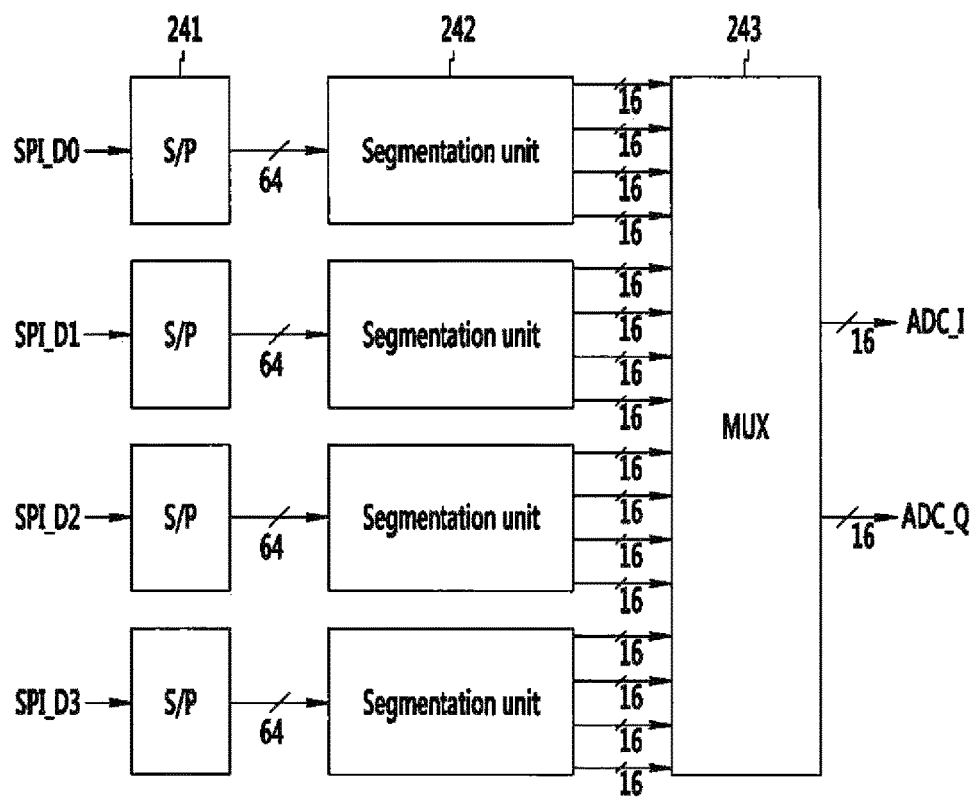
FIG. 3 is a diagram illustrating a structure of a symbol formatter according to an exemplary embodiment of the present invention.
Figure 4B:
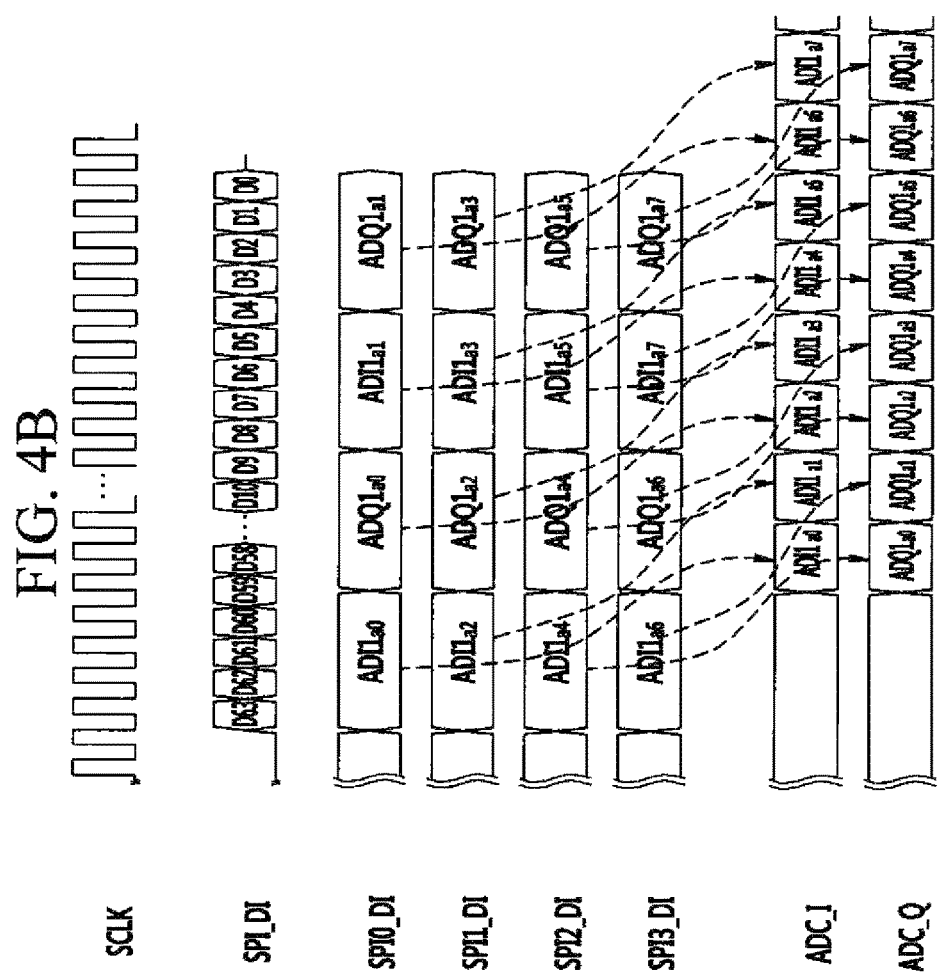

FIG. 3 is a diagram illustrating a structure of a symbol formatter according to an exemplary embodiment of the present invention, and FIGS. 4A and 4B are operation timing diagrams of a symbol formatter according to an exemplary embodiment of the present invention.

Here, for better comprehension and ease of description, digital beamforming (DBF) receives a maximum of 8 beams, and it is assumed that in a short distance mode, 6 beams are received, and in a long distance mode, 2 beams are received. The number of receiving antennas that are included in the antenna unit 21 is 8, and the signal converter 23 is formed with four ADCs supporting 4 channel sampling to support signal conversion of a total of 16 channels by forming each of I/Q channels with 8 channels, and in this case, it is assumed that ADC performs 16-bit sampling and a structure and operation of a symbol formatter will be described. However, the present invention is not limited thereto.

The symbol formatter 24 includes a plurality of serial/parallel converters (S/P) 241, a plurality of segmentation units 242, and a multiplexer (MUX) 243, as shown in FIG. 3, and each of the units 241, 242, and 243 operates as shown in FIGS. 4A and 4B.

When serial bits that are output from a signal converter on each antenna basis are referred to as SPI_D0, SPI_D1, SPI_D2, and SPI_D3, the S/P 241 converts and outputs data of an input serial structure in a parallel structure, and specifically, each of serial bits is processed and output in 64-bit data units corresponding to a 4-channel 16-bit ADC symbol.

The segmentation unit 242 divides and outputs input data in a predetermined bit unit. Specifically, 64-bit data that are input from the S/P 241 are divided and output in 16-bit units.

The MUX 243 rearranges and outputs data that are output from each segmentation unit in an antenna array order. Therefore, a corresponding 16-bit ADC symbol is sequentially output in an antenna array order. Accordingly, as shown in FIG. 3, a first, symbol signal ADC_I and a second symbol signal ADC_Q, which are a complex signals, are acquired. Such a first symbol signal ADC_I and second symbol signal ADC_Q are provided as an input signal of the digital beamforming unit 25.

The DBF unit 25 performs digital beamforming based on a symbol signal that is output from the MUX 243.

Figure 5A:
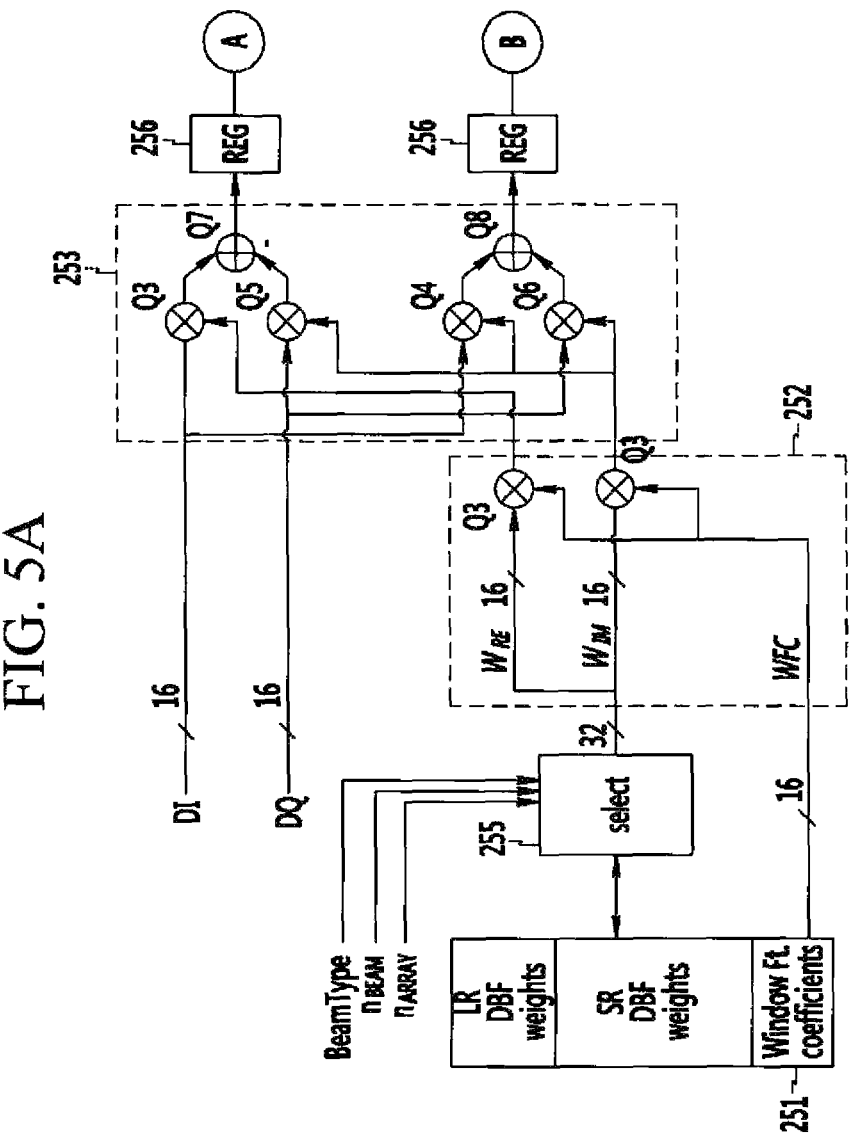
FIGS. 5A and 5B are diagrams illustrating a structure of a digital beamforming unit according to an exemplary embodiment of the present invention.
Figure 5B:
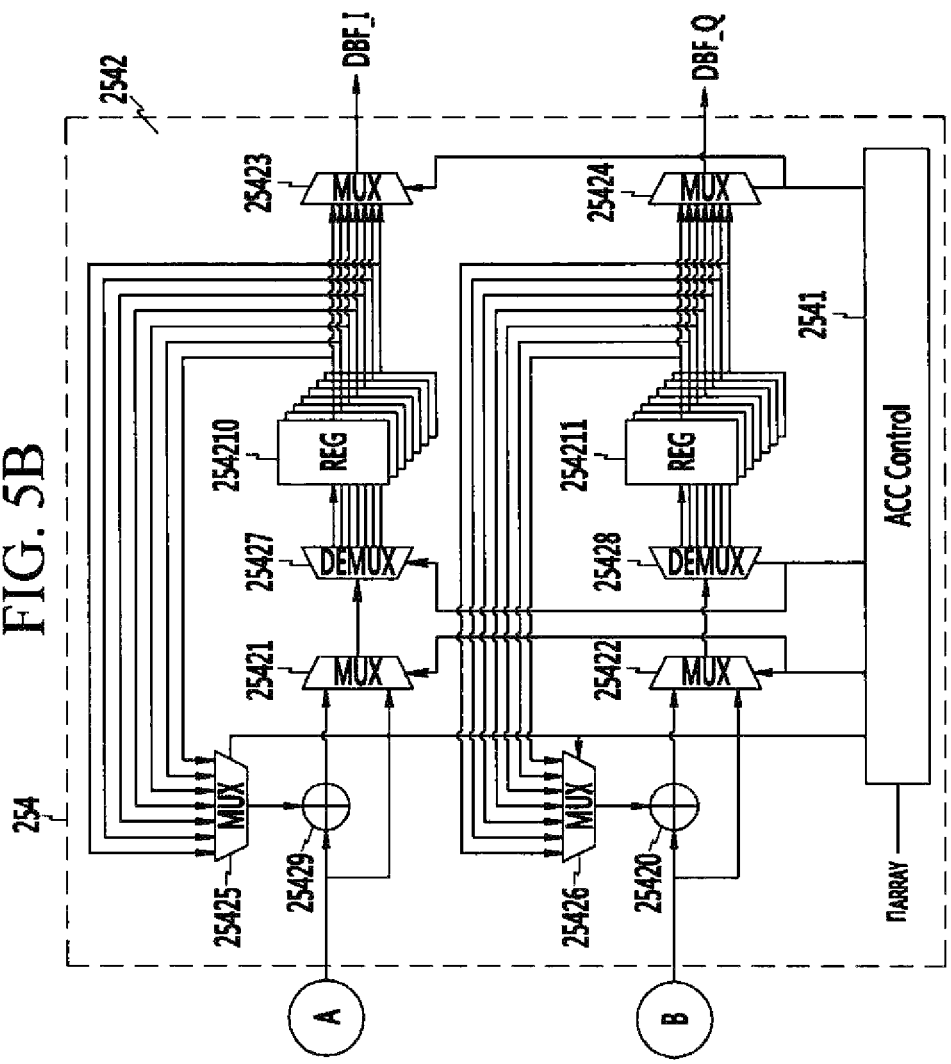

FIGS. 5A and 5B are diagrams illustrating a structure of a DBF unit according to an exemplary embodiment of the present invention.

The DBF unit, i.e., the DBF unit 25, performs digital beamforming of signals that are received by antennas of a linear array structure.

The DBF unit 25 supports both a short distance mode that performs short distance target detection and a long distance mode that performs long distance target detection, and is formed in a serial structure for minimization of hardware complexity. Further, the DBF unit 25 includes a DBF windowing function that improves beamforming performance by lowering a sidelobe level upon performing a DBF processing.

The DBF unit 25 includes a memory 251, a first operation processor 252, a second operation processor 253, and an accumulation unit 254, as shown in FIGS. 5A and 5B, and may further include a selection unit 255 and a register 256.

The memory 251 stores window coefficients for a DBF windowing processing, an SR DBF weight for short distance beams, and an LR DBF weight for long distance beams. Weight values determine directivity of an antenna responding to a received signal.

The first operation processor 252 performs an operation of multiplying window coefficients and DBF weight values. Particularly, the first operation processor 252 includes an operator O1 that multiples a DBF weight value for a long distance that is selected by the selection unit 255 and a window coefficient (WEC), and an operator O2 that multiples a DBF weight value for a short distance that is selected by the selection unit 255 and a WFC.

The selection unit 255 selects one of a plurality of DBF weight values that are stored at the memory 251 based on the beam number $N_{beam}$ and a beam type to generate and the antenna array number $N_{array}$, and outputs the selected DBF weight value to the operators O1 and O2.

The second operation processor 253 performs an operation of multiplying an input signal and a result of multiplication of a DBF weight value and a WEC. For this purpose, the second operation processor 253 includes operators O3 and O4 that multiply an output signal of the operator O1 and a first input signal DI, operators O5 and O6 that multiply an output signal of the operator O2 and a second input signal DQ, an operator O7 that adds and outputs an output signal of the operator O3 and O5, and an operator O9 that adds and outputs an output signal of the operators O4 and O6.

Here, the first input signal DI and the second input signal DQ correspond to a first symbol signal ADC_I and a second symbol signal ADC_Q, which are complex signals that are output from the symbol formatter 24.

The register 256 stores signals that are output from the second operation processor 253 to provide each stored signal to the accumulation unit 254.

The accumulation unit 254 accumulates signals that are output through the second operation processor 253 on a receiving beam basis and outputs a digital beam signal.

The accumulation unit 254 includes an accumulation controller 2541 and an accumulation processor 2542, and while operating according to the control of the accumulation controller 2541, the accumulation processor 2542 accumulates signals that are output through the second operation processor 253 on a beam basis, thereby generating digital beam signals. The accumulation processor 2542 includes MUXs 25421, 25422, 25423, 25424, 25425, and 25426, DEMUXs 25427 and 25428, adders 25429 and 25420, and register files 254210 and 254211.

The DBF supports 8-beam reception for a symbol set that is simultaneously received through a multiple antenna and thus operates with frequency clocks of 8 times a symbol rate.

A symbol set that is simultaneously received through the antenna array is referred to as an in-phase signal {DI n, k}$_{k=0-7}$ and a quadrature-phase signal {DQ n, k}$_{k=0-7}$. Here, k is an antenna number index of an array antenna, and n is a discrete time index. In a receiving symbol DI(n,k), 8 time sharing segments exist, and the time sharing segments are referred to as {Tm}$_{m=0-7}$. Here, an index m is the same as an index of a beam calculated at a corresponding time sharing segment. In a short distance mode, 6 beams are received, and thus at a segment T0, a calculation for generating a 0th beam signal is performed, at a segment T1, a calculation for generating a first beam signal is performed, and at a segment Tx, a calculation for generating an x-th beam signal is performed.

The MUXs 25421 and 25422 select an output of the register 256 when DI(n,0) and DQ(n,0), which are k=0, are input, and select an output of the adders 25429 and 25420 at an input segment, which is k≠0. The register files 254210 and 254211 are formed with 8 registers (register0 for beam0, register1 for beam1, register2 for beam2, register3 for beam3, register4 for beam4, register5 for beam5, register6 for beam6, and register1 for beam7 ) that are allocated to each beam for operation of a maximum of 8 beams, and accumulate a result in which a weight value is multiplied on a beam basis for 8 receiving symbols that are received in the array antenna.

The DEMUXs 25427 and 25428 connect a signal that the MUXs 25421 and 25422 select to an input of register files 254210 and 254211 and connect the signal to an input of register0 at a segment T0, connect the signal to an input of registerl at a segment T1, and connect the signal to an input of registerk at a segment Tk. The MUXs 25423, 25424, 25425, and 25426 select and output an output of registerk at a segment Tk according to a time sharing segment.

Figure 6A:
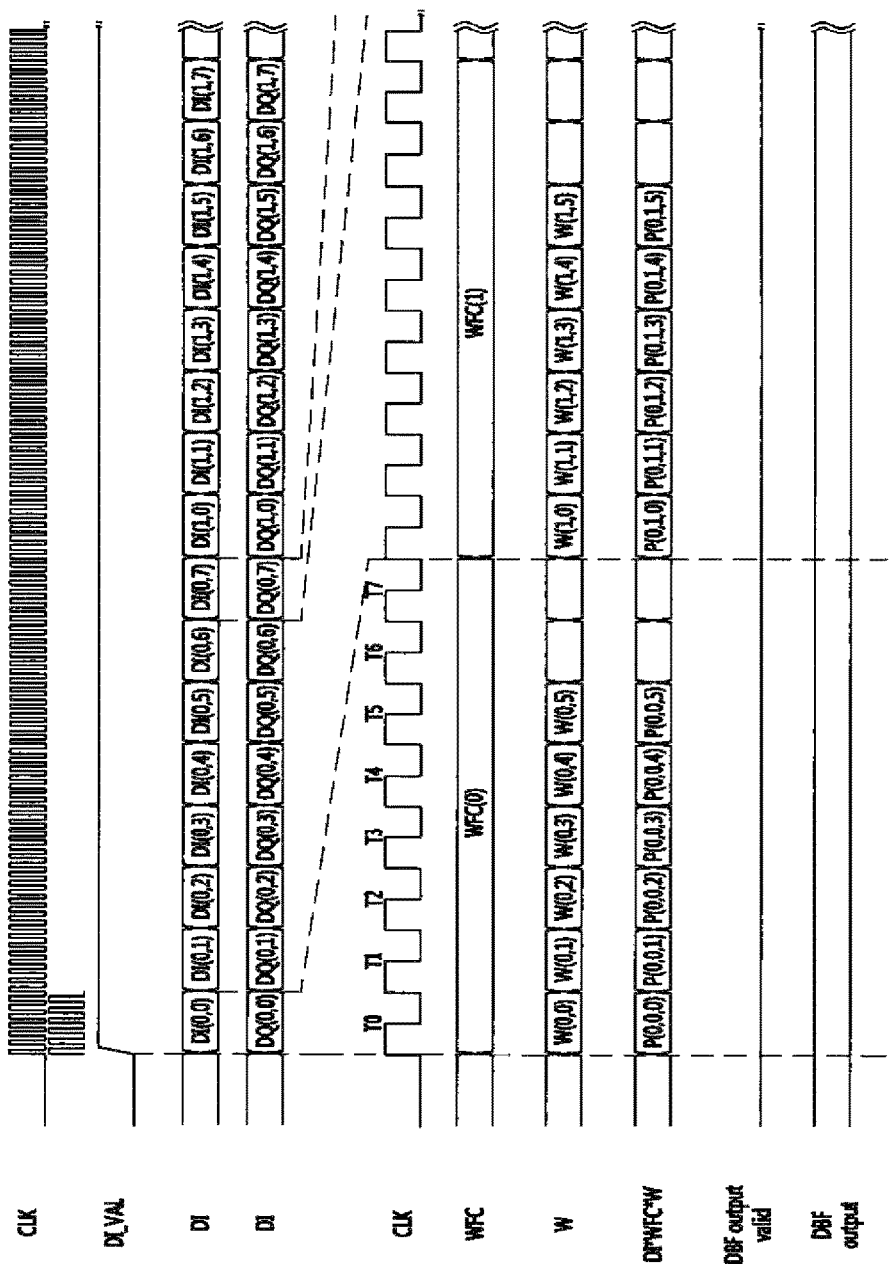
FIGS. 6A and 6B and FIGS. 7A and 7B are diagrams illustrating operation timing of a digital beamforming unit according to an exemplary embodiment of the present invention.
Figure 6B:
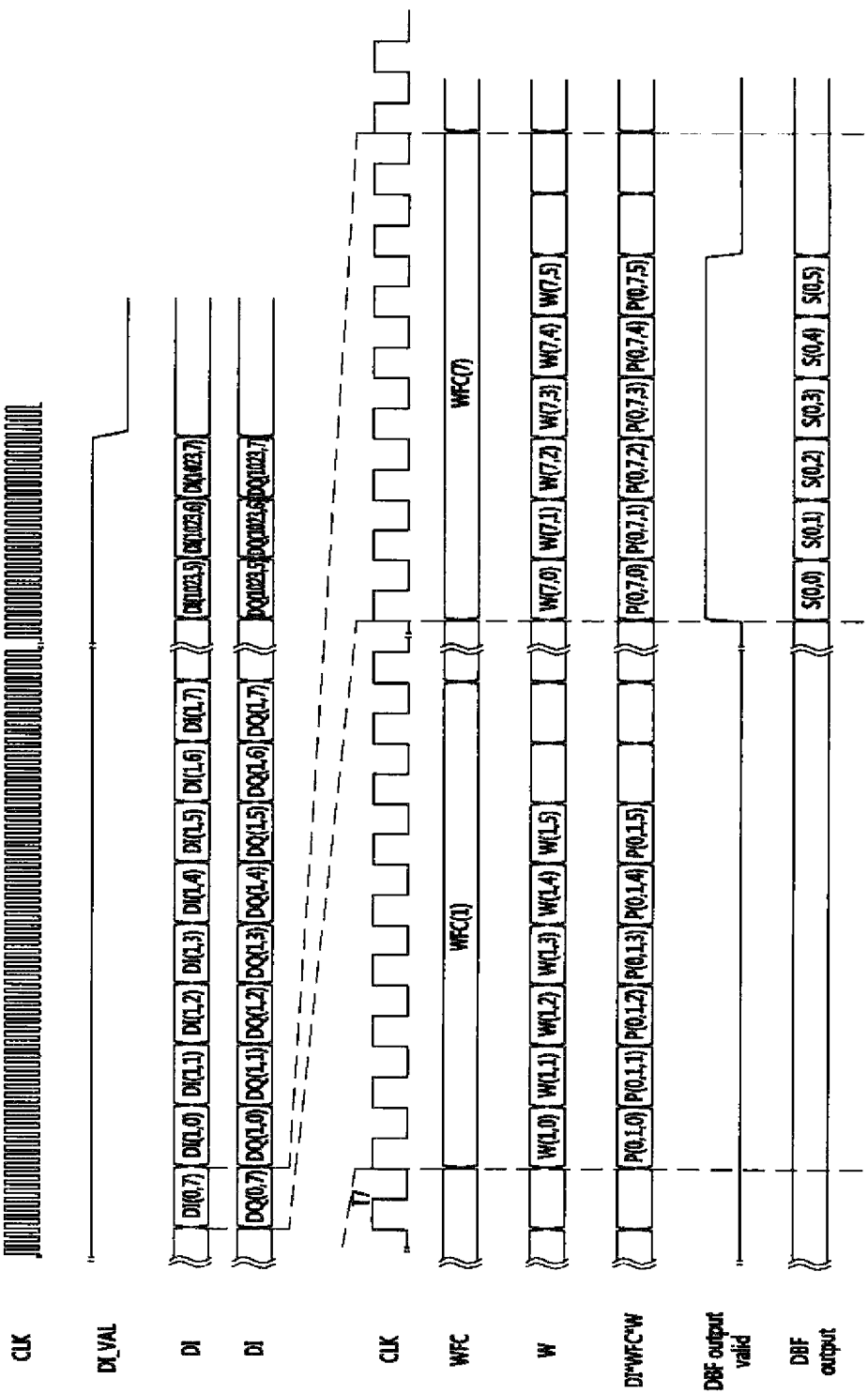
Figure 7A:
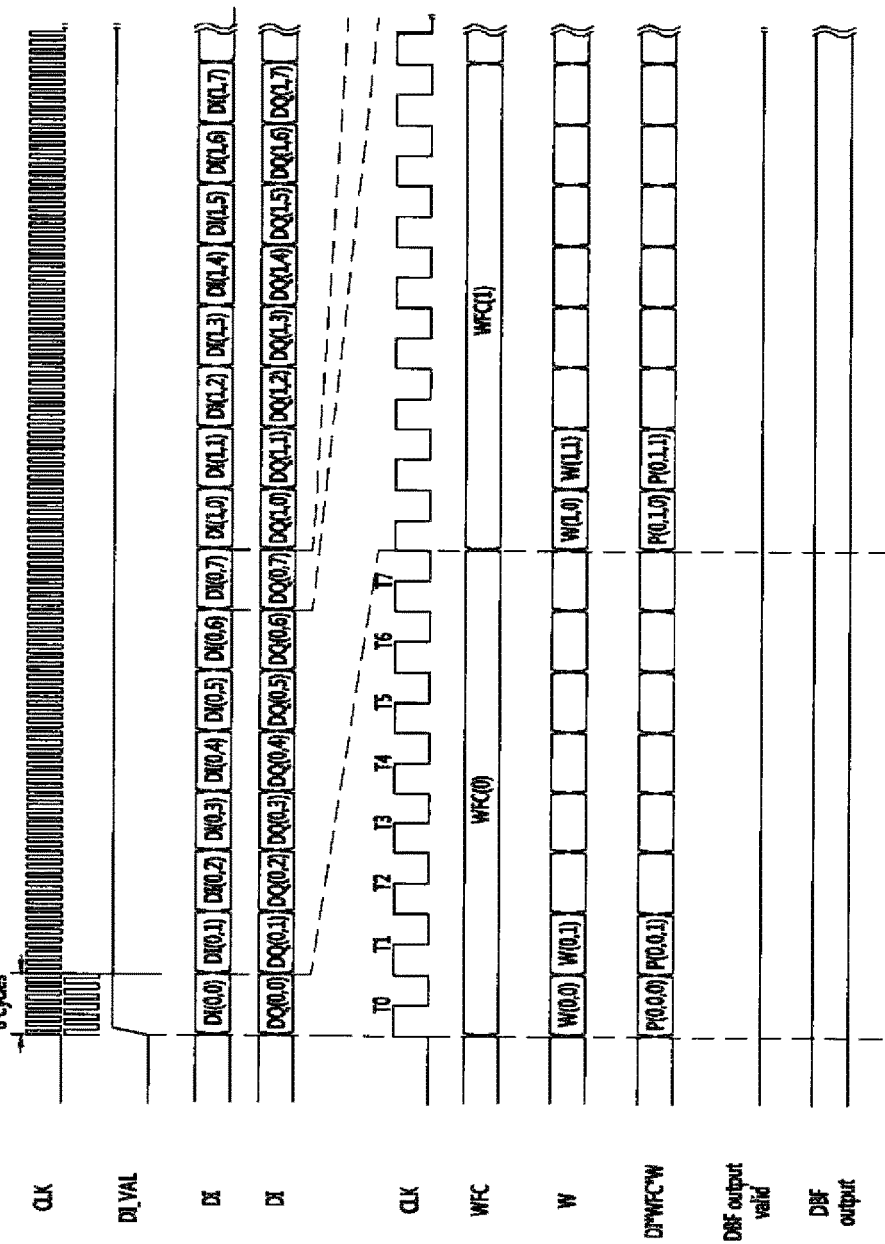
Figure 7B:
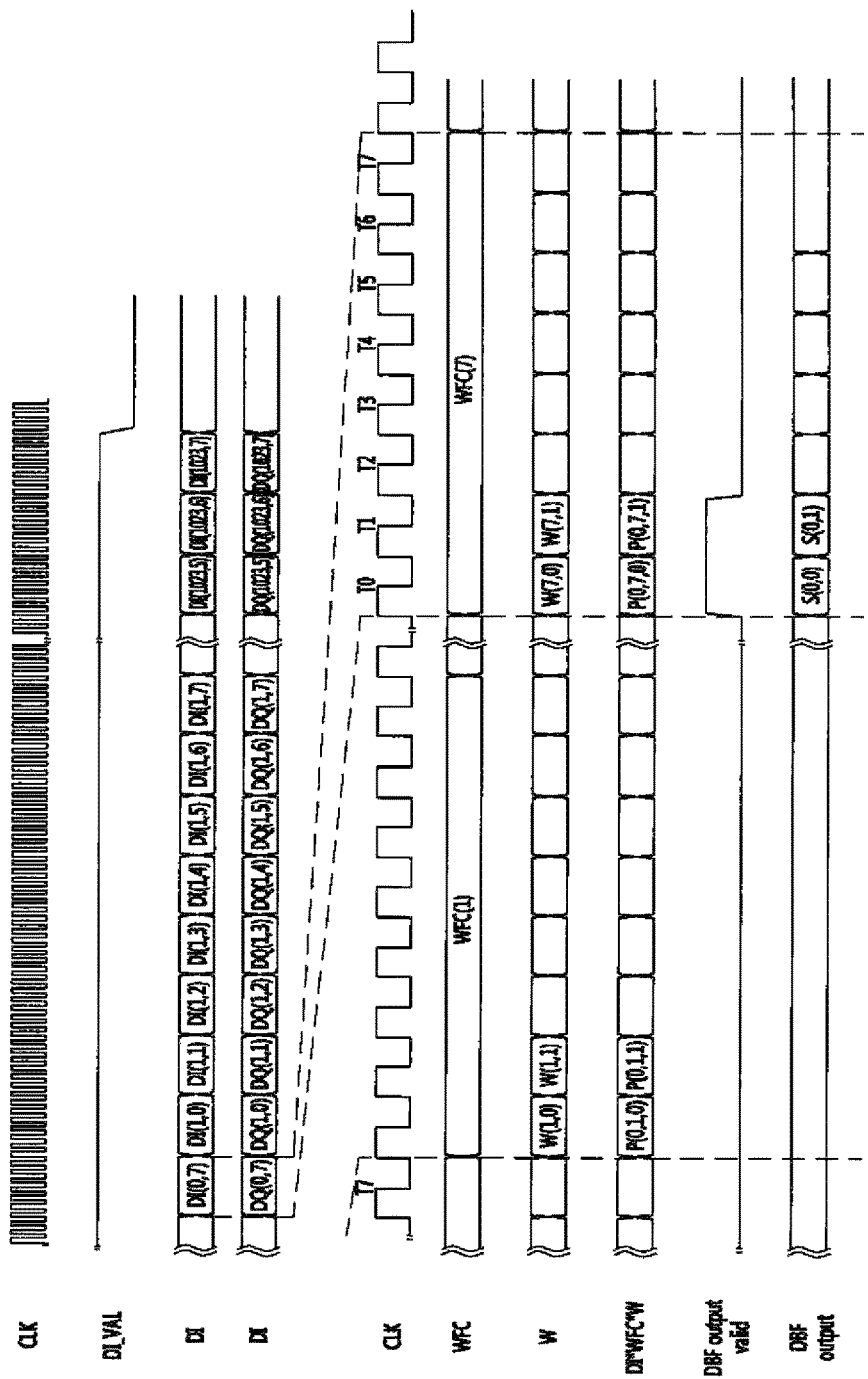

FIGS. 6A and 6B and FIGS. 7A and 7B are diagrams illustrating operation timing of a DBF unit according to an exemplary embodiment of the present invention. Particularly, FIGS. 6A and 6B are diagrams illustrating operation timing in a short distance mode, and FIGS. 7A and 7B are diagrams illustrating operation timing in a long distance mode. Here, the number of antennas forming an array antenna of the antenna unit 21 is 8, and it is assumed that the DBF unit 25 operates with a clock of 8 times an input data rate, forms 6 antenna beams in a short distance mode, and forms two antenna beams in a long distance mode, and operation of a DBF unit will be described. However, the present invention is not limited thereto.

When describing a process of forming a digital beam in a short distance mode under the above assumption, a signal that is received by 8 antennas is sequentially input to the DBF unit 25 in antenna order according to a clock signal CLK.

The first operation processor 252 of the DBF unit 25 multiplies a window coefficient WFC(k,m) by DBF weight values W(k) that are provided from the selection unit 255 and outputs the multiplied values to a weight value signal, and particularly, DBF weight values W(0,0)-W(0,5), W(1,0)-W(1,5), W(7,0)-W(7,5) corresponding to 6 beams are multiplied by window coefficients WFC (0), WFC(1), . . . , WFC(7) and output, respectively, corresponding to a corresponding antenna.

Thereafter, by multiplying an input signal DIN(n,k), where DIN(n,k)=DI(n,k)+i×DQ(n,k), i.e., first symbols DIN (0,0)-DIN(0,7) that are received in each antenna by a signal that is output from the first operation processor 252, the second operation processor 253 outputs P(n,k,m)(P(0,0,0)-P(0,0,5), P(0,1,0)-P(0,1,5), . . . P(0,7,0)-P(0,7,5), which are signals DIN(n,k)×WFC(k) ×W(k,m) in which a weight value, a window coefficient, and a symbol are multiplied. In this way, symbols to which a weight value is multiplied are accumulated on a beam basis by the accumulation unit 254.

As shown in FIGS. 6A and 6B, at a segment in which a symbol of an 8th antenna tab is input, first DBF output symbols S(n,m)(S(0,0), 5(0,1), . . . , S(0,5) of 6 beams are output. In this case, a symbol S(0,0) corresponding to a first beam of first DBF output symbols is the total sum of P(0,0,0), P(0,1,0), P(0,2,0), P(0,3,0), P(0,4,0), and P(0,5,0).

In a long distance mode, DBF output symbols are generated according to the above operation. In a long distance mode, unlike a short distance mode, as shown in FIGS. 7A and 7B, DBF weight values W(0,0)-W(0,1), W(1,0)-W(1,1), W(7,0)-W(7,1) corresponding to two beams are multiplied by weight value coefficients WFC(0), WFC(1), . . . , WFC(7) and output, respectively, corresponding to a corresponding antenna. By multiplying a weight value W(k,m) and a window coefficient WFC(k) by first symbols DIN(0,0)-DIN (0,7) that are received by each antenna, symbols of P(n,k, m)(P(0,0,0)-P(0 0,1), P(0,1,0)-P(0,1,1), . . . P(0,7,0)-P(0,7,1) are output. Symbols to which a weight value is multiplied are accumulated on a beam basis, and at a segment in which a symbol of an 8th antenna tab is input, first DBF output symbols S(n,m)(S(0,0),S(0,1)) of two beams are output. A symbol S(0,0) corresponding to a first beam of first DBF output symbols is the total sum of P(0,0,0) and P(0,1,0).

Beamforming is performed based on DBF output symbols that are formed through such a process.

Hereinafter, a method of forming a beam according to an exemplary embodiment of the present invention will be described.

Figure 8:
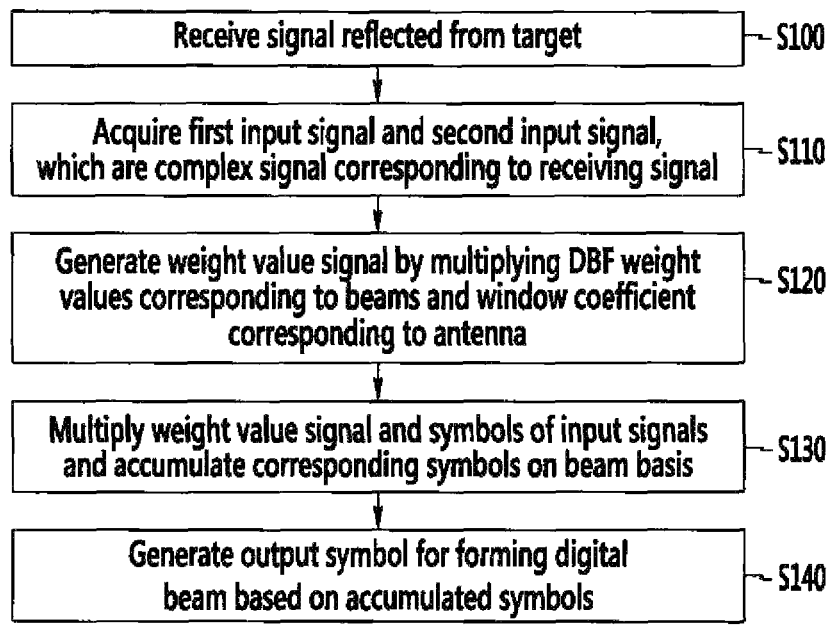
FIG. 8 is a flowchart illustrating a method of forming a beam according to an exemplary embodiment of the present invention.

FIG. 8 is a flowchart illustrating a method of forming a beam according to an exemplary embodiment of the present invention.

As shown in FIG. 8, the transmitting apparatus 10 of the radar signal apparatus 1 according to an exemplary embodiment of the present invention generates an FMCW signal for detecting a target and transmits the FMCW signal to the target, and the beam forming apparatus 20 receives the FMCW signal that hits a target and that is reflected from the target (S100).

An array antenna of the beam forming apparatus 20 receives an FMCW signal, and receiving signals that are received in each antenna are processed on an antenna basis to be processed as digital data. Digital data of each antenna are divided in a predetermined bit unit, and while digital data are rearranged in an antenna array order by the MUX 243, and a first symbol signal ADC_I and a second symbol signal ADC_Q, which are complex signals, are acquired (S110).

The DBF unit 25 performs digital beamforming based on a first input signal corresponding to the first symbol signal ADC_I and a second input signal corresponding to the second symbol signal ADC_Q. Each input signal includes symbols that are arranged in an antenna array order.

The DBF unit 25 outputs a weight value signal by multiplying a window coefficient by DBF weight values. That is, DBF weight values corresponding to beams to form are multiplied and output by a window coefficient corresponding to a corresponding antenna (S120).

By multiplying the weight value signal and symbols of input first and second input signals, a weight value, a window coefficient, and signals in which the symbol is multiplied are acquired. In this way, symbols in which a weight value signal according to the weight value and the window coefficient are multiplied are accumulated on a beam basis (S130).

DBF output symbols are output based on symbols on an accumulated beam basis (S140).

In this way, signals that are received from each antenna are multiplexed to be processed with input signals, which are complex signals, and by processing symbols on each antenna basis that are input in series based on such input signals, DBF output, symbols for forming a digital beam may be generated.

According to an exemplary embodiment of the present invention, a beam forming apparatus having a flexible structure that can operate in a radar system in which the number of radar beams is variable can be provided. Further, both short distance radar and long distance radar can be supported.

Further, because a beam forming apparatus has a serial structure, the beam forming apparatus can be implemented when down-sized and with low power.

The foregoing exemplary embodiment of the present invention may not only be embodied through an apparatus (thing) and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A beam forming apparatus comprising:
an antenna unit configured to include a plurality of antennas;
a receiver configured to convert signals received through the antennas into signals of basebands and output the converted signals;
a signal converter configured to convert the converted signals from the receiver into digital data;
a symbol formatter configured to generate a first symbol signal and a second symbol signal, which are complex signals, by processing the digital data output from the signal converter, wherein the first and second symbol signals comprise a plurality of symbols that are arranged in antenna array order; and
a digital beamforming unit configured to generate a beam symbol signal by applying a window coefficient for windowing, processing and a weight value for each antenna to each of the symbols of the first and second symbol signals, which are sequentially input from the symbol formatter, and accumulating resultant values of the application on a basis of a beam to be generated,
wherein the symbol formatter comprises:
a plurality of segmentation units configured to divide data, which are included in the signals received by each of the antennas, by a preset symbol unit; and
a multiplexer configured to multiplex the divided data and rearrange the multiplexed data in an antenna array order to output the first symbol signal and the second symbol signal.

2. The beam forming apparatus of claim 1, wherein the digital beamforming unit comprises:

a memory in which the weight value for each antenna and the window coefficient for windowing processing are stored;
a first operation processor configured to multiply and output the weight value and the window coefficient;
a second operation processor configured to multiply each symbol of the first and second symbol signals by a signal output from the first operation processor; and
an accumulation unit configured to accumulate signals that are output from the second operation processor on the basis of the beam to be generated and to output the beam symbol signal based on the accumulated signals at a preset time point.

3. The beam forming apparatus of claim 2, wherein the accumulation unit is configured to output the beam symbol signal at a segment in which a symbol corresponding to a final antenna of the first and second symbol signals is input.

4. The beam forming apparatus of claim 2, further comprising a selection unit configured to select from among the weight value and the window coefficient that are stored in the memory based on a beam type and a beam number to generate and a number of antennas, and provide the selected weight value and the selected window coefficient to the first operation processor.

5. The beam forming apparatus of claim 4, wherein the beam type comprises a beam for short distance and a beam for long distance, the beam for short distance being for detecting a target corresponding to a distance shorter than a predetermined distance, and the beam for long distance being for detecting a target corresponding to a distance longer than the predetermined distance.

6. The beam forming apparatus of claim 1, wherein the beam forming apparatus is applied to a radar system in which a number of radar beams to generate varies.

7. A method of forming a beam in a radar system, the method comprising:
converting, by a signal converter of the radar system, signals received through a plurality of antennas into digital data;
generating, by a symbol formatter of the radar system, a first symbol signal and a second symbol signal, which are complex signals, by processing the digital data output from the signal converter, wherein the first and second symbol signals comprise a plurality of symbols that are arranged in an antenna array order;
generating, by a digital beamforming unit of the radar system, a weight value signal by applying a weight value for each antenna and a windowing coefficient for windowing processing to each symbol of the first and second symbol signals which are sequentially output from the symbol formatter; and
generating, by the digital beamforming unit of the radar system, a beam symbol signal by accumulating the weight value signal on a basis of a beam to be generated,
wherein the weight value and the window coefficient are selected based on a beam type and a beam number to generate and a number of antennas.

8. The method of claim 7, wherein the generating of a weight value signal comprises:
multiplying and outputting the weight value and the window coefficient; and
outputting the weight value signal by multiplying each symbol of the first and second symbol signals by a signal in which the weight value and the window coefficient are multiplied.

9. The method of claim 7, wherein the generating of a beam symbol signal comprises accumulating the weight value signal on the basis of the beam to be generated and outputting the beam symbol signal based on an accumulated signal at a segment in which a symbol corresponding to a final antenna of the first and second symbol signals is input.

10. The method of claim 7, wherein the generating of a first symbol signal and a second symbol signals comprises:
- dividing data, which are included in the signals received on an antenna basis, by a preset symbol unit; and
- multiplexing the divided data and rearranging the multiplexed data in an antenna array order to output the first symbol signal and the second symbol signal.

\* \* \* \* \*